(12) United States Patent
Zhang et al.

(10) Patent No.: US 8,737,485 B2
(45) Date of Patent: May 27, 2014

(54) VIDEO CODING MODE SELECTION SYSTEM

(75) Inventors: Ximin Zhang, San Jose, CA (US); Hung-Ju Lee, Pleasanton, CA (US)

(73) Assignees: Sony Corporation, Tokyo (JP); Sony Electronics Inc., Parkridge, NJ (US)

( * ) Notice: Subject to any disclaimer, the term of this patent is extended or adjusted under 35 U.S.C. 154(b) by 1733 days.

(21) Appl. No.: 11/669,941

(22) Filed: Jan. 31, 2007

(65) Prior Publication Data

US 2008/0181311 A1 Jul. 31, 2008

(51) Int. Cl.
*H04N 7/12* (2006.01)

(52) U.S. Cl.
USPC .................. 375/240.24; 375/240.13

(58) Field of Classification Search
USPC ........................ 375/240.13, 240.24
See application file for complete search history.

(56) References Cited

U.S. PATENT DOCUMENTS

| | | | |
|---|---|---|---|
| 6,268,886 B1 * | 7/2001 | Choi | 348/448 |
| 6,697,430 B1 * | 2/2004 | Yasunari et al. | 375/240.13 |
| 7,751,633 B1 * | 7/2010 | Mukherjee | 382/239 |
| 2001/0041054 A1 * | 11/2001 | Dierke | 386/95 |
| 2003/0169817 A1 * | 9/2003 | Song et al. | 375/240.13 |
| 2004/0095511 A1 * | 5/2004 | Amara et al. | 348/620 |
| 2004/0114817 A1 * | 6/2004 | Jayant et al. | 382/239 |
| 2004/0264571 A1 * | 12/2004 | Zhang et al. | 375/240.16 |
| 2005/0135484 A1 * | 6/2005 | Lee et al. | 375/240.16 |
| 2005/0213657 A1 * | 9/2005 | Kodama et al. | 375/240.03 |
| 2005/0276493 A1 * | 12/2005 | Xin et al. | 382/239 |
| 2006/0078051 A1 * | 4/2006 | Liang et al. | 375/240.24 |
| 2006/0082649 A1 * | 4/2006 | Gomila et al. | 348/104 |
| 2006/0133511 A1 | 6/2006 | Chen et al. | |
| 2006/0150233 A1 * | 7/2006 | LeComte et al. | 725/135 |
| 2006/0164328 A1 * | 7/2006 | Jaff | 345/2.3 |
| 2006/0165163 A1 * | 7/2006 | Burazerovic et al. | 375/240.03 |
| 2006/0256853 A1 * | 11/2006 | Schlockermann et al. | 375/240.03 |
| 2007/0019729 A1 * | 1/2007 | Nakagomi et al. | 375/240.13 |
| 2007/0133891 A1 * | 6/2007 | Jeong | 382/238 |
| 2007/0140339 A1 * | 6/2007 | Bhaskaran et al. | 375/240.12 |
| 2007/0171974 A1 * | 7/2007 | Baik | 375/240.12 |
| 2008/0112481 A1 * | 5/2008 | Hsaing et al. | 375/240.03 |

FOREIGN PATENT DOCUMENTS

JP 2006094081 A * 4/2006 ............... H04N 7/32

OTHER PUBLICATIONS

Liu Qiong, Hu Rui-Min, Zhu Li, Zhang Xin-Chen, and Han Zhen, Improved fast intra prediction algorithm of H.264/AVC, Journal of Zhejiang University Science A, 2006, pp. 101-105, China.
Yanfei Shen, Dongming Zhang, Chao Huang, and Jintao Li, Fast Mode Selection Based on Texture Analysis and Local Motion Activity in H.264/JVT, IEEE, 2004.

* cited by examiner

*Primary Examiner* — Michael Pyzocha
(74) *Attorney, Agent, or Firm* — Ishimaru & Associates LLP (57) ABSTRACT

A video system is provided including applying a transform to a picture for generating a transformed block of the picture; determining a type of the picture; selecting a coding mode with the transformed block based on the type of the picture; and applying the coding mode to the picture for encoding and displaying the picture.

20 Claims, 4 Drawing Sheets

VIDEO CODING MODE SELECTION SYSTEM

TECHNICAL FIELD

The present invention relates generally to video systems, and more particularly to a system for advanced video coding compatible with the H.264 specification.

BACKGROUND ART

Modem consumers can receive high definition (HD) television on their Personal Data Appliance. They expect the delivery of HD video to cell phones, and the view through the window provided by DVD movies. High Definition video processing has migrated into all aspects of communication and entertainment. Many of the high definition broadcasts are bringing a realism that can only be matched by looking through a real window to watch the actual event unfold before the viewer.

In order to make the transfer of high definition video more efficient, different video coding schemes have tried to get the best picture from the least amount of data. The Moving Pictures Experts Group (MPEG) has created standards that allow an implementer to supply as good a picture as possible based on a standardized data sequence and algorithm. The emerging standard H.264 (MPEG4 Part 10)/Advanced Video Coding (AVC) design delivers an improvement in coding efficiency typically by a factor of two over MPEG-2, the most widely used video coding standard today. The quality of the video is dependent upon the manipulation of the data in the picture and the rate at which the picture is refreshed. If the rate decreases below about 30 pictures per second the human eye can detect "unnatural" motion.

Among the many important techniques in AVC standard, Intra/Inter mode selection play an important role in the improvement of the compression efficiency. To date, most of the work on mode selection focuses on rate distortion. Namely, how to obtain better Peak Signal to Noise Ratio (PSNR) by using same bit rate, or how to keep same PSNR by using less bit rate. Although this approach can improve the visual quality in low bit rate and low resolution video sequences, it is not optimal from the point of view of human visual system (HVS) when the focus is transferred to high resolution (HD) high bit rate video sequences.

Due to coding structure of the current video compression standard, the picture rate-control consists of three steps: 1. Group of Pictures (GOP) level bit allocation; 2. Picture level bit allocation; and 3. Macro block (MB) level bit allocation. The picture level rate control involves distributing the GOP budget among the picture frames to achieve a maximal and uniform visual quality. Although PSNR does not fully represent the visual quality, it is most commonly used to quantify the visual quality. However, it is noticed that the AVC encoder is intended to blur the fine texture details even in relative high bit-rate. Although AVC can obtain better PSNR, this phenomenon adversely influences the visual quality for some video sequences.

A GOP is made up of a series of pictures starting with an Intra picture. The Intra picture is the reference picture that the GOP is based on. It may represent a video sequence that has a similar theme or background. The Intra picture requires the largest amount of data because it cannot predict from other pictures and all of the detail for the sequence is based on the foundation that it represents. The next picture in the GOP may be a Predicted picture or a Bidirectional predicted picture. The names may be shortened to I-picture, P-picture and B-picture or I, P, and B. The P-picture has less data content that the I-picture and some of the change between the two pictures is predicted based on certain references in the picture.

The use of P-pictures maintains a level of picture quality based on small changes from the I-picture. The B-picture has the least amount of data to represent the picture. It depends on information from two other pictures, the I-picture that starts the GOP and a P-picture that is within a few pictures of the B-picture. The P-picture that is used to construct the B-picture may come earlier or later in the sequence. The B-picture requires "pipeline processing", meaning the data cannot be displayed until information from a later picture is available for processing.

In order to achieve the best balance of picture quality and picture rate performance, different combinations of picture sequences have been attempted. The MPEG-2 standard may use an Intra-picture followed by a Bidirectional predicted picture followed by a Predicted picture (IBP). The combination of the B-picture and the P-picture may be repeated as long as the quality is maintained (IBPBP). When the scene changes or the quality and/or picture rate degrades, another I-picture must be introduced into the sequence, starting a new GOP.

To improve the compression efficiency, de-blocking filters and 4×4 transforms are included in H.264/AVC standard. The optimal Intra/Inter mode decision cannot be obtained without considering them. According to the history of the AVC standard, these tools were optimized for low bit-rate and low resolution, Quarter Common Intermediate Format (QCIF) and Common Intermediate Format (CIF) video sequences. When the focus was transferred to high resolution, Standard Definition (SD) and High Definition (HD) video sequences, the de-blocking filters and 4×4 transforms naturally became revision targets. Following this trend, 8×8 transform and quantization weighting matrices have been adopted by the Professional Extensions Profile of the AVC standard.

Most of the work on adaptive transform type selection focuses how to obtain better PSNR by using the same bit rate, or how to keep same PSNR by using a lower bit rate. Although this approach can improve the visual quality, it is not optimal from the point of view of the human visual system (HVS). The HVS is a luminance and contrast profile that represents human visual processing capabilities.

Thus, a need still remains for a video encoding system that can deliver high quality video to the high definition video market. In view of the ever-increasing demand for high definition video, it is increasingly critical that answers be found to these problems. In view of the ever-increasing commercial competitive pressures, along with growing consumer expectations and the diminishing opportunities for meaningful product differentiation in the marketplace, it is critical that answers be found for these problems as soon as possible.

Solutions to these problems have long been sought but prior developments have not taught or suggested any solutions and, thus, solutions to these problems have long eluded those skilled in the art.

DISCLOSURE OF THE INVENTION

The present invention provides a video system including applying a transform to a picture for generating a transformed block of the picture; determining a type of the picture; selecting a coding mode with the transformed block based on the type of the picture; and applying the coding mode to the picture for encoding and displaying the picture.

Certain embodiments of the invention have other aspects in addition to or in place of those mentioned above. The aspects will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that process or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail. Likewise, the drawings showing embodiments of the system are semi-diagrammatic and not to scale and, particularly, some of the dimensions are for the clarity of presentation and are shown greatly exaggerated in the drawing FIGs. Where multiple embodiments are disclosed and described, having some features in common, for clarity and ease of illustration, description, and comprehension thereof, similar and like features one to another will ordinarily be described with like reference numerals.

For expository purposes, the term "system" means the method and the apparatus of the present invention.

Figure 1:
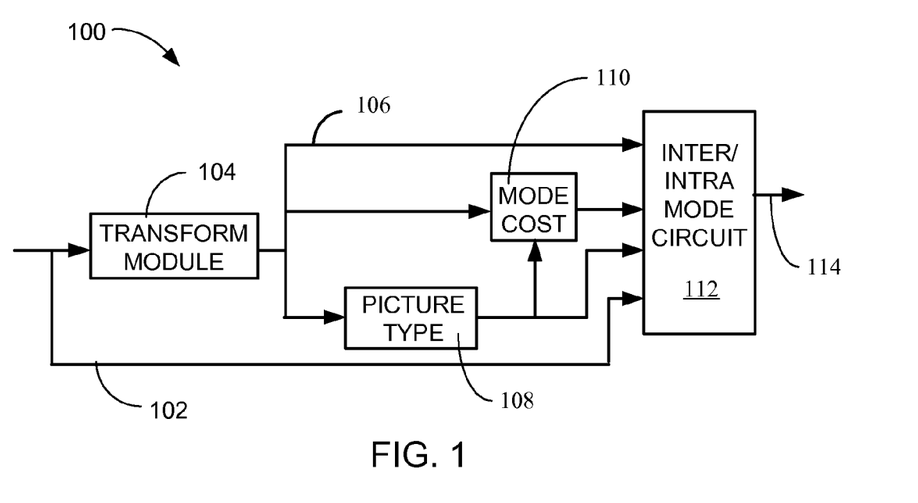
FIG. 1 is a functional block diagram of a video system in an embodiment of the present invention.

Referring now to FIG. 1, therein is shown a functional block diagram of a video system 100, in an embodiment of the present invention. The functional block diagram of the video system 100 depicts a picture port 102, such as a picture input bus, coupled to a transform module 104. The transform module 104 analyzes the picture presented on the picture port 102 to determine what type of transform best suits the current picture. A transformed block 106, from the transform module 104, is coupled to a picture type circuit 108, for determining a type of picture being analyzed, and a mode cost circuit 110, for calculating a mode cost of the possible encoding modes. The current picture type may be an Intra-picture, a predicted-picture, or a bidirectional predicted picture.

The mode cost circuit 110 receives input from the transform module 104 and the picture type circuit 108. The output of the mode cost circuit 110 is coupled to an Inter/Intra mode circuit 112. The Inter/Intra mode circuit 112 receives input from the picture port 102, the transform module 104, and the mode cost circuit 110. The Inter/Intra mode circuit 112 accepts the picture from the picture port 102, the transformed block from the transform module 104, and a coding mode calculated by the mode cost circuit 110. The Inter/Intra mode circuit 112 monitors the stream from the picture port 102, the transformed block 106 of the transform module 104 to determine the optimum type of a coding mode 114 for the current picture.

Figure 2:
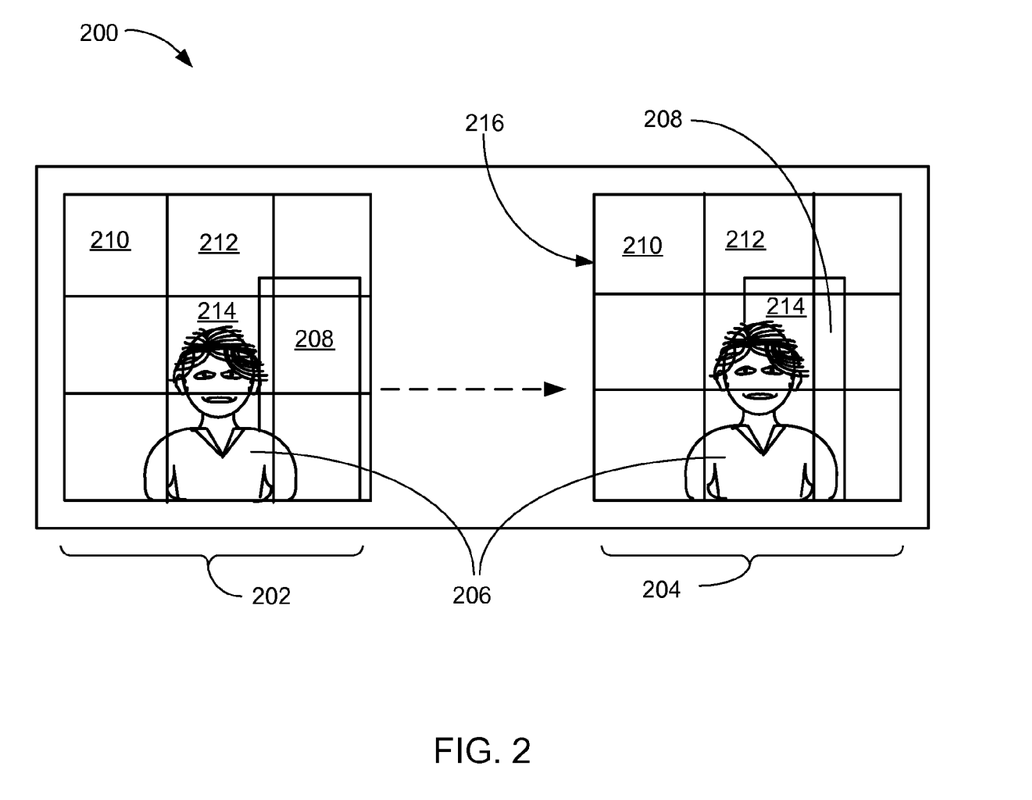
FIG. 2 is a group of pictures as might be processed by the video encoding system of the present invention.

Referring now to FIG. 2, therein is shown a group of pictures 200 as might be processed by the video system 100 of the present invention. The group of pictures 200 depicts an Intra picture 202 on the left side of the group of pictures 200 and a current picture 204 on the right side of the group of pictures 200. The current picture 204 may be a "P" picture or a "B" picture and there may be additional pictures either before or after the current picture 204.

A foreground object 206, such as a person, vehicle, or building, is centered in the lower frame of the Intra picture 202. A background object 208, such as a sign, a vehicle, or a person is located at the far right side of the Intra picture 202. In the current picture 204, the foreground object has not moved relative to the Intra picture 202, but the background object 208 has moved from the far right in the Intra picture 202 to the right center in the current picture 204.

The group of pictures 200 is a very simplified example and in actual practice, each of the Intra picture 202 or the current picture 204 may have thousands of objects within their boundaries. For purposes of this example, a single moving background object is used to explain the operation of the video system 100.

Each of the Intra picture 202 and the current picture 204 are divided into segments. A reference sub-picture 210, such as an edge macro block, in the Intra picture 202 is processed by the video system 100 in order to establish an initial reference for the group of pictures 200. A current sub-picture 212, such as a non-texture macro block, is processed in successive order to complete the Intra picture 202.

The current picture 204 is processed in a similar fashion as the Intra picture 202. As the reference sub-picture 210 and the current sub-picture 212 of the current picture 204 are processed, changes in the reference sub-picture 210 and the current sub-picture 212 are stored. In the current example, the movement of the background object 208 is detected in several of the current sub-picture 212. The changes are processed to generate and store information about the movement of objects in the current sub-picture 212.

A central sub-picture 214, such as a human visual system texture macro block, may contain a variance of the luminance known as texture. The reference sub-picture 210 may be designated as an edge block when it is detected as having an edge 216 of the current picture 204. As the reference sub-picture 210 is detected as having the edge 216, the analysis would switch the transformed block 106 of FIG. 1.

Figure 3:
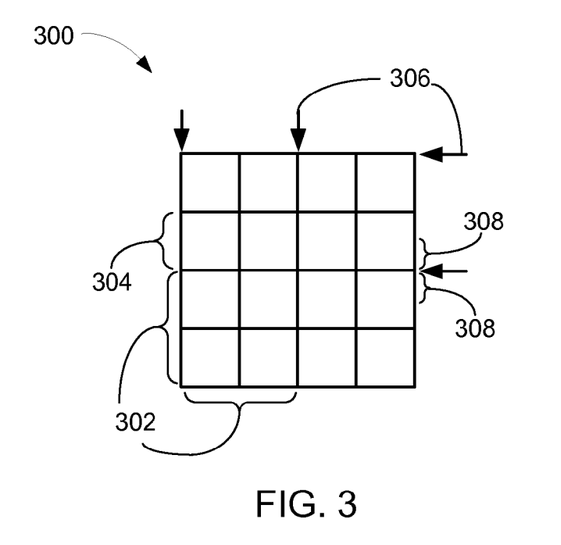
FIG. 3 is a diagram of a macro block in a de-blocking filtering process.

Referring now to FIG. 3, therein is shown a diagram of a macro block 300 in a de-blocking filtering process. The diagram of the macro block 300 depicts the macro block 300 segmented into a 4×4 array having segment boundaries in the vertical and horizontal directions. It has long been known that an 8×8 transform 302 can keep more film grain and texture than a 4×4 transform 304. The film grain and texture relate to the granularity of the media initially used to record the video sequence. The presence of film grain can add realism to plain surfaces. The use of the 8×8 transform 302 helps to preserve some of the realism captured by the original media. On the other hand, the 4×4 transform 304 is preferred to be used on the edges of the picture where abrupt changes in texture and luminance create a contrast interference to reduce the "ringing noise".

Both an intra 4×4 mode and an intra 16×16 mode use the 4×4 transform and intra 8×8 mode use the 8×8 transform, as specified in the H.264 standard. When interpreting the lines of the macro block 300 as luma boundaries, for the 4×4 transform 304 all of the lines in the horizontal and vertical directions are filtered. For the 8×8 transform 302, such as a quadrant of the macro block 300, only the horizontal and vertical lines having an arrow 306 are filtered. The filtering operation is based on a boundary strength 308. The boundary strength 308 is chosen according to the position of the luma edge within the macro block 300. If any side of the boundary 216 of FIG. 2 is intra coded and the boundary is the macro block 300 boundary, the boundary strength 308 is set to 4 for the strongest filtering. If any side of the boundary 216 is intra coded and the edge is not the macro block 300 boundary, the boundary strength 308 is set to 3 for the second strongest filtering. If both sides of the edge 216 are inter coded, the value of the boundary strength can be between 2 to 0 according to other encoding conditions. The H.264 specification allows up to three pixels on either side of the boundary to be filtered for the strongest filtering.

In the intra picture 202 of FIG. 2, almost all the pixels will be filtered in the texture area if intra coded 4×4 or intra coded 16×16 is selected since the boundary lines are four pixels apart. Moreover, it is very possible some pixels are filtered twice even if they are not located along the block boundary. When only fine texture details or film grain exists in the macro block 300 and the contrast in the texture area is not strong, many details will be smoothed out even in relative high bit-rate. In 8×8 transformed version of the macro block 300 the boundary line distance is two times the boundary line distance compared to a 4×4 transformed version of the macro block 300, many pixels are not processed by the de-blocking filter. Therefore, intra coded 8×8 can keep more texture detail than intra coded 4×4 and intra coded 16×16.

Figure 4:
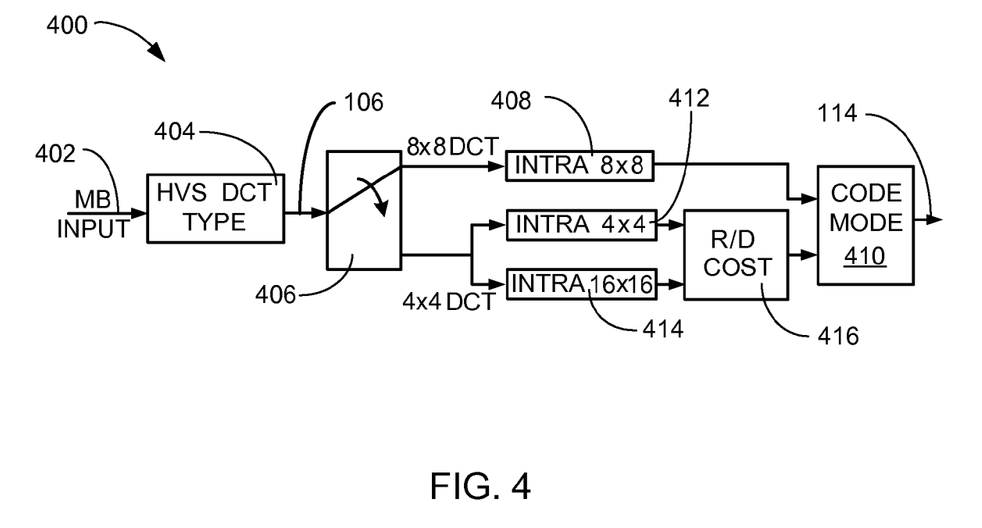
FIG. 4 is a block diagram of a human visual system coding decision block for an Intra picture.

Referring now to FIG. 4, therein is shown a block diagram of a human visual system coding decision block 400 for the Intra picture 202, of FIG. 2. The block diagram of the human visual system coding decision block 400 includes a macro block input port 402 connected to an HVS Discrete Cosine Transform circuit 404, for identifying the appropriate transform for the macro block 300, of FIG. 3. The HVS Discrete Cosine Transform circuit 404 produces the transformed block 106 of FIG. 1, such as an I-WS transformed block or a non-HVS transformed block. If the transformed block 106 is attributed to the category of non-HVS texture area or there is the edge 216 in the macro block 300, a transform switch 406 selects the heavy transform, such as a 4×4 transform. Otherwise, the transform switch 406 selects the light transform, such as an intra 8×8 module 408 as the coding device for the transform. A coding circuit 410 provides an intra coding mode for coding the intra picture 202 based on the type of transform selected by the HVS Discrete Cosine Transform circuit 404.

The transform type decision method, provides for a texture sensitivity lower bound and an upper bound to be calculated. If the current texture sensitivity measure is less than the lower bound, only an intra 16×16 module 414 is checked. Otherwise, only an intra 4×4 module 412 is checked. This limits the check to only one kind of intra prediction for reducing the complexity and the execution time of the design.

If the 4×4 transform is selected, only the intra 4×4 module 412 and the intra 16×16 module 414 predictions are checked. Both the intra 4×4 module 412 and the intra 16×16 module 414 are coupled to a rate distortion (R/D) cost circuit 416. The module providing the minimum value to the R/D cost circuit 416 is selected as the coding mode 114. It is understood that the description above may be implemented as an integrated circuit, a printed circuit board having discrete components, software, or a combination thereof.

Figure 5:
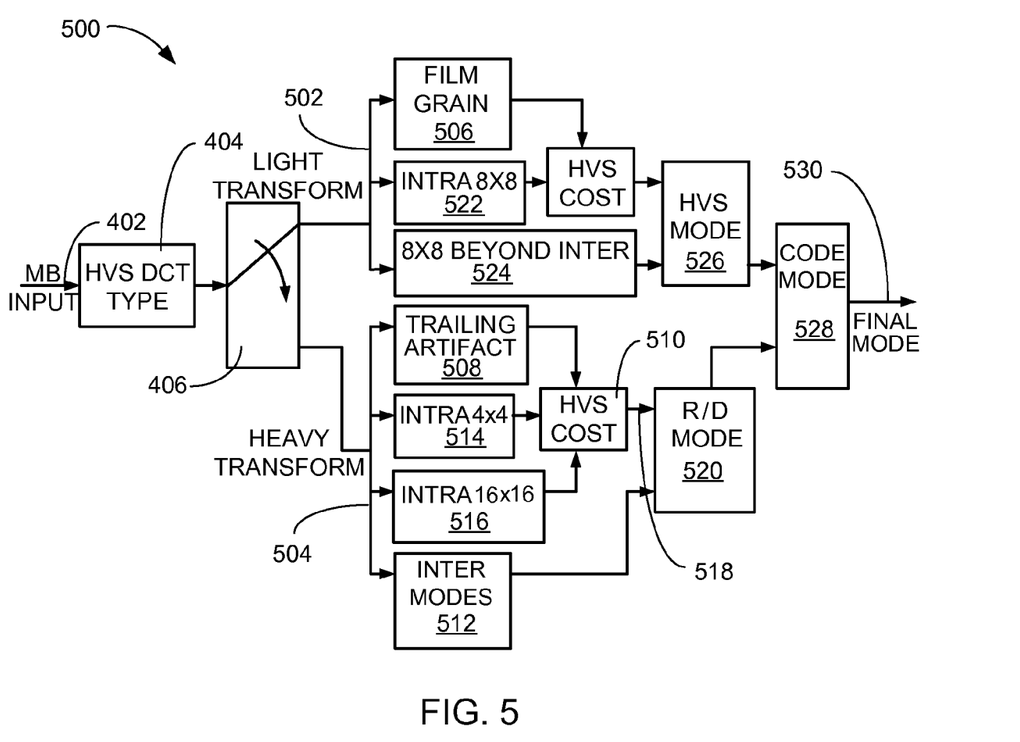
FIG. 5 is a block diagram of a human visual system coding decision block for a Predicted picture and a Bidirectional predicted picture.

Referring now to FIG. 5, therein is shown a block diagram of a human visual system coding decision block 500 for the current picture 204 of FIG. 2, such as a Predicted picture and a Bidirectional predicted picture. The block diagram of the human visual system coding decision block 500 depicts the macro block input port 402 connected to the HVS Discrete Cosine Transform circuit 404. The HVS Discrete Cosine Transform circuit 404 is connected to the transform switch 406 having a light transform 502, such as an 8×8 discrete cosine transform, and a heavy transform 504, such as a 4×4 discrete cosine transform. The light transform 502 is activated by the current sub-picture 212 of FIG. 2, being an HVS texture macro block of the current picture 204. The heavy transform 504 is activated by the current sub-picture 212 being a non-texture macro block or the edge 216 of FIG. 2.

Trailing artifacts usually appear as a series of dots trailing behind a moving object and are very visible. Trailing artifacts appear when the encoder is forced to discard large amounts useful data, such as when using a large quantizer or when coding video at low rates. In order to detect the potential to produce trailing artifacts, a trailing artifact circuit 508 is connected to the transform switch 406. The trailing artifact circuit 508 identifies the current sub-picture 212 that has a motion prediction residue that is very small relative to the value of quantization scale. In this circumstance, all of the DCT coefficients would become zero after the quantization. If the encoder did not detect and correct this issue, the decoder would directly copy the current sub-picture 212 of the intra picture 202 into the current picture 204 based on the transmitted motion vector, which causes the trailing artifact.

The trailing artifact circuit 508 activates a human visual system (HVS) cost module 510. The HVS cost module 510 is activated if the heavy transform 504 is selected, an inter modes prediction circuit 512, an intra 4×4 circuit 514, and an intra 16×16 circuit 516 are checked. If the current sub-picture 212 is a flat version of the current sub-picture 212 with high trailing artifacts possibility in a current picture 204, the intra mode cost is modulated to generate an HVS based intra mode cost 518. Then, a rate distortion mode circuit 520 passes the mode having the minimum rate distortion (R/D) cost.

The most important phenomenon of trailing artifacts is the propagation of very small residue error. When Intra mode is selected, the prediction error is independent picture by picture. That means Intra mode can prevent error propagation. Moreover, due to nature of intra prediction, decoded the current sub-picture 212 once decoded tends to have a uniform distribution. The possibility to generate a slight trailing artifact like texture distribution is very small for an intra coded sub-picture. Therefore, the intra 4×4 circuit 514 or the intra 16×16 circuit 516 should be selected in areas suspected of having trailing artifacts in the Predicted picture.

An alternative process that may be used to correct trailing artifacts in the encoding process begins by checking the flatness of the current sub-picture 212 prior to making the coding decision. The flatness can be measured by the HVS Discrete Cosine Transform circuit 404 by identifying the 16×16 variance and the 8×8 variance of the current sub-picture 212. If the flatness measure is larger than a threshold, the inter prediction error is checked. The prediction error can be the sum-of-absolute-differences (SAD) or the sum-of-absolutehadamard-transformed-differences (SATD) based prediction error or local reconstructed distortion. If the current sub-picture 212 has a flat texture distribution and the inter prediction error is larger than a threshold, the possibility of trailing artifacts is high in this sub-picture. When the intra mode cost is calculated, the value of a Lagrangian multiplier $\lambda_{MODE}$ is reduced and the mode decision is conducted accordingly. Based on the flatness measure, the Lagrangian multiplier $\lambda_{MODE}$ can be reduced by different levels. This process is repeated for all of the current sub-pictures 212 in the current picture 204.

By using the above process, the intra mode is more likely to be selected for smooth areas having a degree of flatness. The intra mode subjects the area to a more thorough filtering, which will remove any small prediction error residue that could cause trailing artifacts.

The light transform 502 may be coupled to a film grain detector 506, an intra coded 8×8 module 522, or an 8×8 beyond inter coded module 524. The film grain detector 506 identifies film grain that naturally occurs in film emulsions. The film grain is more visible in a flat background and less visible in a heavy texture background. Usually, the human visual system interprets film grain as giving the movie a natural and sharper appearance. With standard-definition and ordinary television displays, film grain cannot be detected, so there was no point in trying to keep it. With high definition television sets, the film grain can be preserved and displayed provided the original grain can be properly delivered to the television. Therefore, the coding technique that can preserve the film grain is desirable.

Unlike the texture and solid objects 206 of FIG. 2, the film grain pattern is random from the intra picture 202 to the current picture 204. Except for the average intensity (DC) part, the inter prediction cannot reduce the entropy of the AC part. Many bits have to be used to encode inter predicted residue. Although the film grain looks like random noise, each grain has size larger than one pixel and it is relatively uniform within the grain. Therefore, the intra correlation is often higher than the inter correlation in the flat film grain area. By using the rate distortion mode circuit, intra mode usually is selected. However, the intra prediction is intended to smooth the random like texture details with moderate bit rate. Even if the PSNR is improved with fewer bits, the film grain is gone and the visual quality is reduced. On the other hand, the bad prediction of inter mode may cause some noise. This actually enhances the feeling of film grain and makes low PSNR results look more realistic.

If the light transform 502 is selected, only the intra coded 8×8 module 522 is compared to the 8×8 beyond inter coded module 524 to determine the final mode. For the normal texture distribution, the texture keeping difference between the intra coded 8×8 module 522 and the 8×8 beyond inter coded module 524 is minor. On the other hand, for the film grain like texture distribution, the texture preserving difference between the intra coded 8×8 module 522 and the 8×8 beyond inter coded module 524 is dramatic.

It has been unexpectedly discovered that the 8×8 beyond inter coded module 524 provides a level of noise in the current sub-picture 212 that may simulate film grain and provide an additional level of realism to textured areas. This discovery may also lead to the use of low levels of random noise that could replace the processing of film grain.

After the light transform 502 is selected for the current sub-picture 212, the film grain detector 506 is applied. If no film grain is detected, a small penalty is added to the cost of the intra coded 8×8 module 522 to reflect the fact that inter modes suffer less texture loss due to de-blocking effects. If film grain is detected, an intra coded 8×8 module cost is calculated based on different quantization scale than the inter mode. The 8×8 beyond inter module cost is calculated by equation 1:

$$\text{Inter\_cos } t=\text{Distortion}(QP)+\lambda\text{Rate}(QP) \quad (1)$$

The intra coded 8×8 module cost is calculated by equation 2:

$$\text{Intra8×8\_cos } t=\text{Distortion}(QP)+\lambda\text{Rate}(QP-k) \quad (2)$$

The mode with minimum cost is selected by an HVS mode circuit 526. If inter mode is selected, QP is used as the quantization scale; if intra mode is selected, QP−k is used as the quantization scale. In the above equation, k denotes the quantization difference. The value of k can be empirically obtained from a set of experiments. Due to the texture masking effects, this value should be gradually reduced in the texture area.

Since the above process is related to quantization adjustment, it must be combined with sub-picture level rate control in order to maintain good picture quality. In order to circumvent this level of complication, an alternative approach may be implemented that is independent of rate control and film grain.

The film grain detector 506 may calculate a lower bound and an upper bound for film grain sensitivity based on the minimum 8×8 variance of the transformed block 106, of FIG. 1. The difference between the minimum 8×8 variance and the maximum 8×8 variance in the current sub-picture 212 is also calculated. If the minimum 8×8 variance is larger than the lower bound and smaller than the upper bound and the variance difference is less than the minimum 8×8 variance, the intra coded 8×8 module 522 is disabled and the 8×8 beyond inter coded module 524 is selected by a picture code mode select circuit 528 as a final mode output 530. Otherwise, intra coded 8×8 module cost is compared to the 8×8 beyond inter coded module cost and the mode with minimum cost is used to select the final mode output 530.

Figure 6:
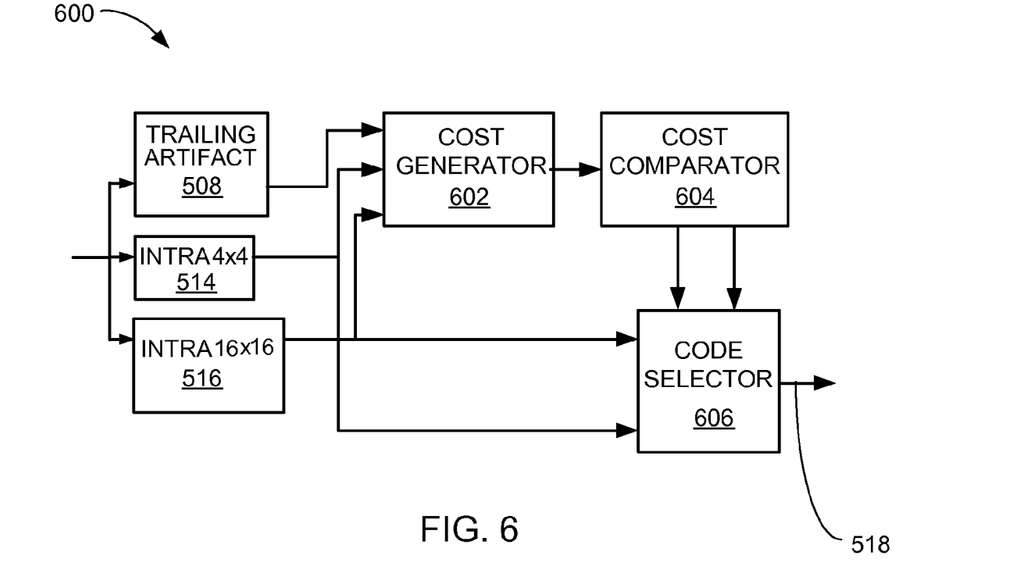
FIG. 6 is a block diagram of the HVS cost module, in an embodiment of the present invention.

Referring now to FIG. 6, therein is shown a block diagram of an HVS cost module 600, in an embodiment of the present invention. The block diagram of the HVS cost module 600 depicts the trailing artifact circuit 508, the intra 4×4 circuit 514, and the intra 16×16 circuit 516 coupled to a cost generator 602. The cost generator 602 calculates the possibility of producing a trailing artifact while processing the current sub-picture 212. Based on the information obtained by the trailing artifact circuit 508, the cost generator 602 produces a set of parameters for each of the coding structures to indicate their impact on the current sub-picture 212.

The output of the cost generator 602 is connected to a cost comparator 604 which evaluates the coding overhead from the intra 4×4 circuit 514 and the intra 16×16 circuit 516 to determine which coding scheme is most likely to prevent the trailing artifact. The output of the cost comparator 604 is coupled to a code selector 606 that selectively passes the output of the intra 4×4 circuit 514 or the intra 16×16 circuit 516.

Figure 7:
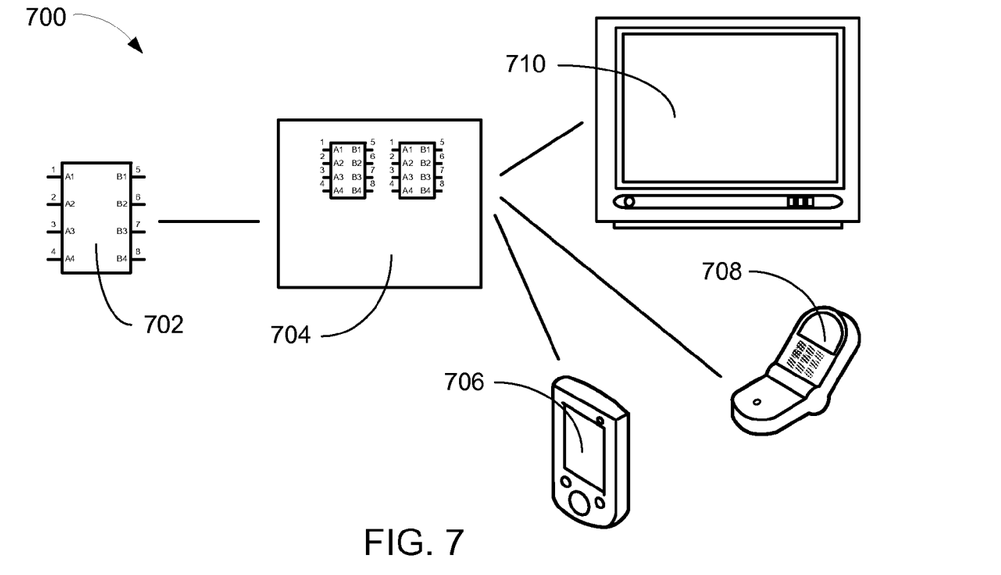
FIG. 7 is an electronic system in an embodiment of the present invention.

Referring now to FIG. 7, therein is shown an electronic system 700 in an embodiment of the present invention. The video system 100 of FIG. 1 may be implemented in an integrated circuit 702, such as a video sub-system, or on a printed circuit board 704. The integrated circuit 702 or the printed circuit board 704, of the present invention may form a video sub-system in an electronic device such as a personal video device 706, a wireless telephone 708, or a high definition television 710.

Figure 8:
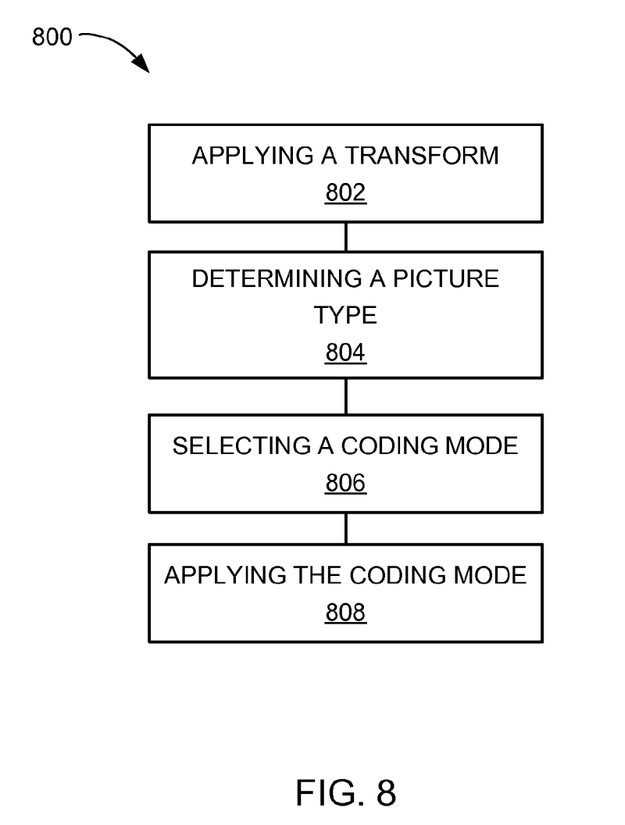
FIG. 8 is a flow chart of a video system for operating the video system in an embodiment of the present invention.

Referring now to FIG. 8, therein is shown a flow chart of a video system 800 for operating video system in an embodiment of the present invention. The system 800 includes applying a transform to a picture for generating a transformed block of the picture in a block 802; determining a type of the picture in a block 804; selecting a coding mode with the transformed block based on the type of the picture in a block 806; and applying the coding mode to the picture for encoding and displaying the picture in a block 808.

An aspect of the embodiments of the present invention is that it valuably supports and services the historical trend of simplifying systems and increasing performance.

These and other valuable aspects of the embodiments of the present invention consequently further the state of the technology to at least the next level.

Thus, it has been discovered that the video system of the present invention furnishes important and heretofore unknown and unavailable solutions, capabilities, and functional aspects for operating a video system that supports the advanced video coding (AVC) aspects of the MPEG 4 part 10 specification.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operating a video system comprising:
   applying a transform to a picture for generating a transformed block of the picture;
   determining a type of the transform based on the variance of the luminance of the transformed block and the presence of an edge;
   determining a type of the picture;
   selecting a coding mode based on the type of the transform, the type of the picture, the presence of film grain, and the presence of trailing artifacts; and
   applying the coding mode to the picture for encoding and for displaying the picture on a device.

2. The method as claimed in claim 1 wherein determining the type of the picture includes determining the type as an Intra picture, a bidirectional predicted picture, or a predicted picture.

3. The method as claimed in claim 1 further comprising calculating a mode cost includes:
   calculating a rate distortion cost;
   calculating an inter-cost;
   calculating an intra-cost; and
   determining the coding mode from the rate distortion cost, the inter-cost, and the intra-cost.

4. The method as claimed in claim 1 further comprising calculating a mode cost from the transformed block and the type of the picture for selecting the coding mode includes:
   determining a flatness of the picture; and
   determining the coding mode from the flatness.

5. The method as claimed in claim 1 further comprising:
   forming a video sub-system with the video system; and
   forming a device, a printed circuit board, or an electronic system with the video system.

6. A method of operating a video system comprising:
   providing a picture having a macro block;
   applying a transform to the macro block for generating a transformed block of the macro block;
   determining a type of the transform based on the variance of the luminance of the transformed block and the presence of an edge;
   determining a first type of the picture;
   determining a second type of the macro block;
   selecting a coding mode based on the type of the transform, the first type of the picture, the second type of the macro block, the presence of film grain, and the presence of trailing artifacts; and
   applying the coding mode to the picture for encoding and for displaying the picture on a device.

7. The method as claimed in claim 6 further comprising calculating a mode cost includes:
   determining a flatness of the macro block;
   calculating an upper bound and a lower bound for the flatness of the macro block;
   calculating a difference between a minimum variance and a maximum variance of the flatness in the macro block; and
   determining the coding mode by comparing the difference with the upper bound and the lower bound.

8. The method as claimed in claim 6 further comprising calculating a mode cost includes:
   determining a flatness of the macro block;
   providing a flatness threshold for a the macro block;
   providing an error threshold for the macro block;
   calculating a flatness of the macro block;
   calculating a prediction error of the macro block; and
   adjusting the coding mode cost by comparing the flatness with the flatness threshold and by comparing the prediction error with the error threshold.

9. The method as claimed in claim 6 further comprising reducing an error propagation from the picture to a subsequent picture.

10. The method as claimed in claim 6 further comprising reducing the trailing artifacts in the picture.

11. A video system comprising:
    a transform module for generating a transformed block of a picture;
    a transform switch coupled to the transform module, the transform switch for determining a type of the transform based on the variance of the luminance of the transformed block and the presence of an edge;
    a picture type circuit coupled to the transform module;
    a coding mode circuit coupled to the picture type circuit and the transform module for selecting a coding mode based on a transform selection of the transform module, the presence of film grain, and the presence of trailing artifacts; and
    wherein:
    the coding mode circuit for applying the coding mode to the picture.

12. The system as claimed in claim 11 wherein the picture type circuit coupled to the transform module for determining the picture type as an Intra picture, a bidirectional predicted picture, or a predicted picture.

13. The system as claimed in claim 11 further comprising a mode cost circuit includes:
    a cost generator for generating a coding overhead;
    a cost comparator connected to the cost generator for evaluating the coding overhead; and
    a code selector connected to the cost comparator for passing the code having the minimum overhead.

14. The system as claimed in claim 11 further comprising a mode cost circuit includes:
    a transform circuit for determining a flatness of the picture; and a coding circuit for determining the coding mode from the flatness.

15. The system as claimed in claim 11 further comprising:
a video sub-system with the video system; and
an integrated circuit, a printed circuit board, or an electronic device formed with the video sub-system.

16. The system as claimed in claim 11 further comprising:
a film grain detector for identifying the film grain of a macro block;
an intra coded module for processing the transformed block of the macro block; and
a human visual system cost module coupled to the film grain detector and the intra coded module for determining the coding mode of the macro block.

17. The system as claimed in claim 16 further comprising a mode cost circuit includes:
a trailing artifact circuit for calculating an upper bound and a lower bound for a flatness of the macro block;
the mode cost circuit for using the upper bound and the lower bound; and
a rate distortion mode circuit coupled to the mode cost circuit for selecting the coding mode to reduce the trailing artifacts.

18. The system as claimed in claim 16 further comprising a mode cost circuit includes:
a trailing artifact circuit;
a cost generator coupled to the trailing artifact circuit for generating a coding overhead;
a cost comparator connected to the cost generator for evaluating the coding overhead; and
a code selector coupled to the cost comparator for passing the coding mode having the minimum overhead.

19. The system as claimed in claim 16 further comprising a trailing artifact circuit for reducing an error propagation from a reference picture to the picture.

20. The system as claimed in claim 16 further comprising a rate distortion mode circuit for reducing the trailing artifacts in the picture.

* * * * *

UNITED STATES PATENT AND TRADEMARK OFFICE
CERTIFICATE OF CORRECTION

| | |
|---|---|
| PATENT NO. | : 8,737,485 B2 |
| APPLICATION NO. | : 11/669941 |
| DATED | : May 27, 2014 |
| INVENTOR(S) | : Zhang et al. |

Page 1 of 1

It is certified that error appears in the above-identified patent and that said Letters Patent is hereby corrected as shown below:

In the Specification:

1. Column 1, line 12, delete "Modem" and insert therefor --Modern--
2. Column 5, line 48, delete "an I-WS transformed" and insert therefor
   --an HVS transformed--

Signed and Sealed this
Tenth Day of November, 2015

Michelle K. Lee
*Director of the United States Patent and Trademark Office*